(12) United States Patent
Zeng

(10) Patent No.: US 12,259,638 B2
(45) Date of Patent: Mar. 25, 2025

(54) ELECTRONIC DEVICE AND COLOR CORRECTION SYSTEM OF EXTERNAL FLASH

(71) Applicant: YINGYOU EQUIPMENT CO., LTD., Guangdong (CN)

(72) Inventor: Weiling Zeng, Guangdong (CN)

(73) Assignee: YINGYOU EQUIPMENT CO., LTD., Guangdong (CN)

(*) Notice: Subject to any disclaimer, the term of this patent is extended or adjusted under 35 U.S.C. 154(b) by 81 days.

(21) Appl. No.: 18/296,575

(22) Filed: Apr. 6, 2023

(65) Prior Publication Data
US 2023/0244123 A1 Aug. 3, 2023

Related U.S. Application Data

(63) Continuation of application No. PCT/CN2021/101590, filed on Jun. 22, 2021.

(30) Foreign Application Priority Data

Jan. 22, 2021 (CN) ........................ 202110094012.5
Jan. 22, 2021 (CN) ........................ 202120193628.3

(51) Int. Cl.
*G03B 15/03* (2021.01)
*H04N 23/57* (2023.01)
(Continued)

(52) U.S. Cl.
CPC ............. *G03B 15/03* (2013.01); *H04N 23/57* (2023.01); *H04N 23/631* (2023.01);
(Continued)

(58) Field of Classification Search
CPC .......... G03B 15/03; G03B 33/00; G03B 7/17; G03B 2215/0557; G03B 15/05;
(Continued)

(56) References Cited

U.S. PATENT DOCUMENTS 5,231,500 A * 7/1993 Miyaji .................. H04N 23/88
348/E5.038
9,071,744 B1 6/2015 Rahman et al.
(Continued)

FOREIGN PATENT DOCUMENTS

CN 1446444 10/2003
CN 104280979 1/2015
(Continued)

OTHER PUBLICATIONS

WIPO, International Search Report for PCT/CN2021/101590, Oct. 28, 2021.
(Continued)

*Primary Examiner* — Chiawei Chen
(74) *Attorney, Agent, or Firm* — Hodgson Russ LLP

(57) ABSTRACT

An electronic device comprises a light-emitting information receiving circuit and a color correction processing circuit. The light-emitting information receiving circuit is configured to be electrically connected to a color correction detection device to receive light-emitting information of an external flash detected by the color correction detection device. The color correction processing circuit is electrically connected to the light-emitting information receiving circuit to perform color correction processing according to the light-emitting information so as to generate color correction result information, the color correction result information being configured to be transmitted to the external flash to correct the light emission of the external flash. Moreover, provided is a color correction system of the external flash.

18 Claims, 3 Drawing Sheets

(51) Int. Cl.
*H04N 23/63* (2023.01)
*H04N 23/661* (2023.01)
*H04N 23/70* (2023.01)
*H04N 23/84* (2023.01)

(52) U.S. Cl.
CPC ........... *H04N 23/661* (2023.01); *H04N 23/70* (2023.01); *H04N 23/84* (2023.01)

(58) Field of Classification Search
CPC .... H04N 23/57; H04N 23/631; H04N 23/661; H04N 23/70; H04N 23/84; H05B 45/22; H05B 47/19; H05B 47/11
See application file for complete search history.

(56) References Cited

U.S. PATENT DOCUMENTS

| | | | |
|---|---|---|---|
| 9,110,355 B1* | 8/2015 | Nourbakhsh | G03B 15/05 |
| 9,794,551 B1* | 10/2017 | Oh | H04N 17/002 |
| 2005/0195290 A1* | 9/2005 | Takeshita | H04N 23/88 348/223.1 |
| 2005/0281549 A1 | 12/2005 | Shih et al. | |
| 2009/0129074 A1* | 5/2009 | Roberts | G02F 1/1336 362/231 |
| 2010/0060704 A1* | 3/2010 | Tsuchiya | G03G 15/326 347/130 |
| 2012/0113208 A1* | 5/2012 | Ishikawa | B41J 2/451 347/237 |
| 2012/0154627 A1 | 6/2012 | Rivard et al. | |
| 2013/0342817 A1* | 12/2013 | Katahira | H04N 5/58 353/121 |
| 2016/0381761 A1* | 12/2016 | Tseng | H05B 45/60 315/158 |
| 2017/0202075 A1* | 7/2017 | Zhou | H04N 23/74 |
| 2017/0339328 A1* | 11/2017 | Hamada | H04N 23/66 |
| 2017/0374265 A1* | 12/2017 | Finlow-Bates | G01S 19/14 |
| 2020/0375005 A1* | 11/2020 | Gu | G03B 15/03 |
| 2021/0099630 A1* | 4/2021 | Sugawara | H04N 23/72 |
| 2024/0064882 A1* | 2/2024 | Zeng | H05B 47/11 |

FOREIGN PATENT DOCUMENTS

| | | |
|---|---|---|
| CN | 206212187 | 5/2017 |
| CN | 110731080 | 1/2020 |
| CN | 111277699 | 6/2020 |
| CN | 112731733 | 4/2021 |
| CN | 112731734 | 4/2021 |
| CN | 112731735 | 4/2021 |
| CN | 112731736 | 4/2021 |
| CN | 112764292 | 5/2021 |
| CN | 112764293 | 5/2021 |
| CN | 112799267 | 5/2021 |
| CN | 112859488 | 5/2021 |
| CN | 214795518 | 11/2021 |
| DE | 19842367 | 7/2004 |
| EP | 1176849 | 1/2002 |
| JP | 2003114456 | 4/2003 |
| JP | 2006121163 | 5/2006 |
| JP | 2009260565 | 11/2009 |
| JP | 2011239084 | 11/2011 |
| WO | 2016161486 | 10/2016 |

OTHER PUBLICATIONS

EPO, Extended European Search Report for EP Application No. 21920523.4, Jun. 24, 2024.
CNIPA, First Office Action for CN Application No. 202110094012. 5, Dec. 26, 2024.

* cited by examiner

ELECTRONIC DEVICE AND COLOR CORRECTION SYSTEM OF EXTERNAL FLASH

CROSS-REFERENCE TO RELATED APPLICATIONS

This application is a continuation of International Application No. PCT/CN2021/101590, filed Jun. 22, 2021, which claims priority to Chinese Patent Application Nos. 202110094012.5 and 202120193628.5, each filed Jan. 22, 2021, the entire disclosures of which are incorporated herein by reference.

TECHNOLOGY FIELD

The present application relates to the technical field of flash for photographing, in particular to an electronic device and a color correction system of an external flash.

BACKGROUND

With the development of mobile communication technology, mobile terminals have played an increasingly important role in people's life and work. Especially some mobile electronic devices with camera function, such as mobile phone, MP4, PDA, notebook computer, etc. These mobile terminals have camera function to bring great fun to people's lives. Photographing requires light source, and artificial light is often needed to assist in photographing besides natural light. The artificial light source of mobile terminal with photographing function often cannot meet the actual use requirements. Therefore, people often use external flash to assist in photographing.

However, after long-term use of LED beads in external flash, there is a deviation between chromaticity and luminous intensity, which leads to the actual luminous parameters such as luminous brightness and chromaticity not reaching the preset luminous parameters, thus failing to achieve the expected light supplement effect.

The above information disclosed in the Background is only for enhancement of understanding of the background of the present application and therefore it may include information that does not constitute prior art known to a person of ordinary skill in the art.

SUMMARY

There are provided an electronic device and a color correction system of an external flash according to embodiments of the present disclosure. The technical solution is as below:

According to one aspect of the present application, there is further provided an electronic device, which includes:

a light-emitting information receiving circuit configured to be electrically connected to a color correction detection device, to receive light-emitting information of an external flash detected by a color correction detection device;

a color correction processing circuit electrically connected to the light-emitting information receiving circuit and configured to perform color correction processing according to the light-emitting information so as to generate color correction result information, wherein the color correction result information is configured to be transmitted to the external flash to correct light emission of the external flash.

According to another aspect of the present application, there is provided a color correction system including an external flash, a color correction detection device and the electronic device;

wherein the color correction detection device is configured to detect light-emitting information of the external flash; the electronic device is electrically connected to the color correction detection device so as to receive the light-emitting information of the external flash detected by the color correction detection device, and performs color correction processing according to the light-emitting information to generate the color correction result information; and the external flash corrects light emission according to the color correction result information.

It should be understood that the above general description and the following detailed description are exemplary only and are not intended to limit the present application.

BRIEF DESCRIPTION OF DRAWINGS

The above and other objects, features and advantages of the present application will become more apparent by describing exemplary embodiments thereof in detail with reference to the accompanying drawings.

Figure 1:
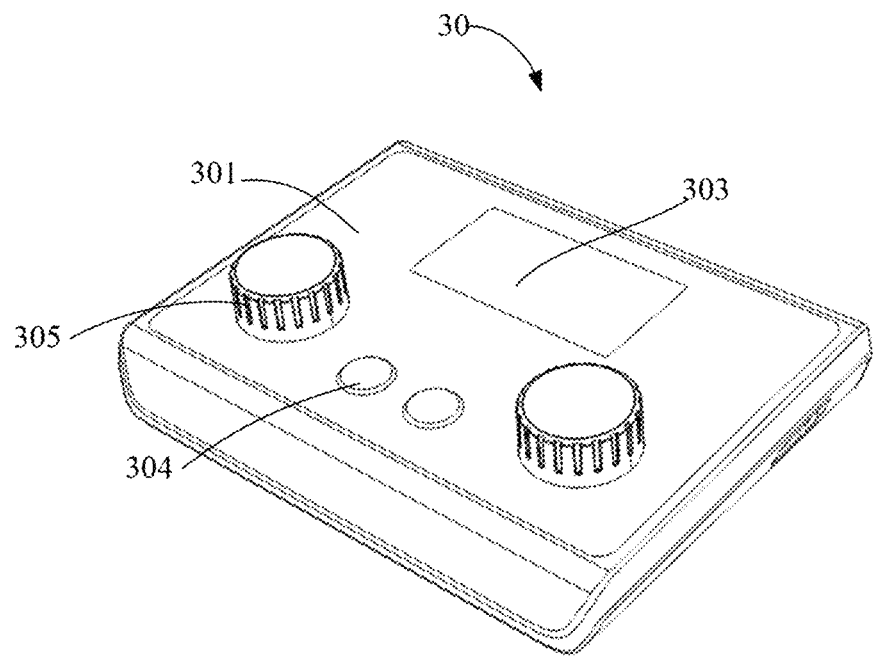
FIG. 1 is a schematic structural diagram of an electronic device according to an exemplary embodiment.

The reference signs are described as follows:

DESCRIPTION OF THE EMBODIMENTS

Although the present application can readily be embodied in different forms of embodiment, however, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must have the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front and back) are used to explain that the structure and movement of the various elements of the present application are not absolute but relative. These descriptions are appropriate when these elements are in the positions shown in the drawings. If the description of the positions of the elements changes, the indications of the directions change accordingly.

The exemplary embodiments will now be described more fully with reference to the accompanying drawings. However, the exemplary embodiments can be implemented in a variety of forms and should not be construed as being limited to the examples set forth herein. Rather, these embodiments are provided so that the present application will be more comprehensive and complete, and the concept of exemplary embodiments will be fully communicated to those skilled in the art. The accompanying drawings are only schematic illustrations of the present application and are not necessarily drawn to scale. Like reference signs in the figures denote identical or similar parts and thus repetitive descriptions thereof will be omitted.

The embodiment of the present application is further elaborated below in conjunction with the accompanying drawings of the description.

Firstly, the present application provides an electronic device for color correction of an external flash. Color correction may refer to matching the actual luminous parameters of the external flash with the set luminous parameters. It can also refer to adjusting the consistency of luminous parameters of each LED bead in the external flash.

Referring to FIG. 1, in an embodiment, the electronic device 30 includes a casing 301. In particular, the casing 301 is generally square and has an accommodating cavity within the casing 301 to accommodate one or more circuit boards. It should be understood that the relevant circuits of the present application may be partially or fully laid on the circuit boards. A side surface of the casing 301 may be provided with a toggle key, and when the toggle key is in an open state, the electronic device 30 is activated, and when the toggle key is in a closed state, the electronic device 30 is turned off. The electronic device 30 of the present application may be a handheld device, which is convenient for the user to carry out color correction on the external flash 10 at any time. The electronic device 30 may be configured with a battery or charging interface such that the electronic device 30 may be used without an external power source.

Figure 2:
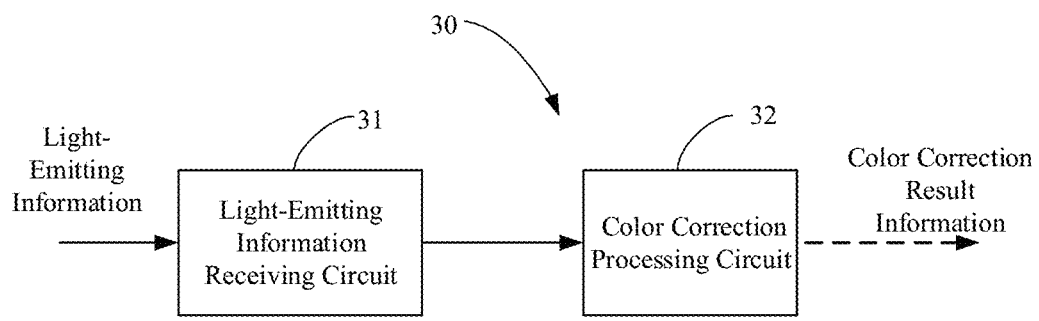
FIG. 2 is a circuit configuration block diagram of the electronic device according to an exemplary embodiment.

Referring to FIG. 2, in an embodiment, the electronic device 30 includes a light-emitting information receiving circuit 31 and a color correction processing circuit 32. The light-emitting information receiving circuit 31 is electrically connected to the color correction detection device 20 to receive the light-emitting information of the external flash 10 detected by the color correction detection device 20. The color correction processing circuit 32 is electrically connected to the light-emitting information receiving circuit 31 for performing color correction processing based on the light-emitting information to generate color correction result information. The color correction result information transmitted to the external flash 10 is configured to correct the light emission of the external flash 10.

In this embodiment, the electronic device 30 may be an intelligent terminal such as a mobile phone, a tablet, a notebook computer. It can also be a smart wearable device, such as a smart headset, a smart bracelet, a smart belt, etc.

Figure 3:
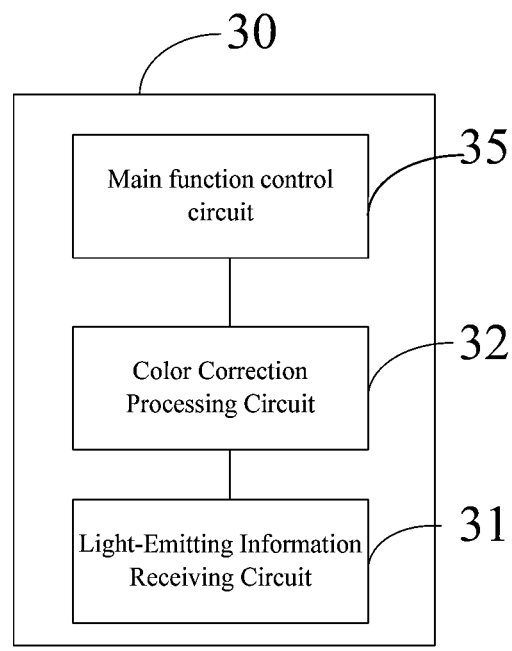
FIG. 3 is an electric circuit block diagram of an internal structure of the electronic device according to an exemplary embodiment.

Referring to FIG. 3, in an embodiment, the electronic device 30 is an intelligent terminal. The electronic device 30 also includes a main function control circuit 35. The main function control circuit 35 is used to provide a main function for the intelligent terminal. In this embodiment, the main function is determined by the specific function of the electronic device 30. For example, when the electronic device 30 is a notebook computer, the main function control circuit 35 is a main control board of the notebook computer.

In an embodiment, the electronic device 30 includes a display circuit, the display circuit is used for displaying a Graphical User Interface (GUI) for inputting color correction control commands. Specifically, a color correction application software is installed in the electronic device 30, and when the color correction application software is run, a color correction control interface can be displayed on a display screen. The color correction control interface has a plurality of controls for users to issue color correction start instructions, set color correction parameters, select color correction modes (collectively referred to as color correction control instructions here) and so on. The color correction control interface can also have a display window to display the color correction process. This embodiment improves the human-computer interaction capability, and is convenient for the user to correct different parameters (luminance, chrominance, saturation, etc.) of the external flash 10 according to his own requirements, and correct them to target parameters that meet his own requirements. The color correction processing circuit 32 performs a logical operation based on the sampled light-emitting information according to the color correction control command, thereby generating color correction result information.

In this embodiment, the light-emitting information receiving circuit 31 may include a memory such as a ROM or a RAM and the like, and the light-emitting information receiving circuit 31 may perform some pre-processing on the light-emitting information to wait for the call of the color correction processing circuit 32 at any time.

In this embodiment, the light-emitting information of the light source circuit is collected by the color correction detection device 20. In this embodiment, the light-emitting information includes one or more of luminance, chromaticity, saturation and the like. In this embodiment, the external flash 10 can be viewed as a whole to collect its luminance, chrominance, saturation and other parameters. In another embodiment, the light-emitting information is one or more parameters of luminance, chromaticity, saturation and the like, of each LED light source in the flash lamp including a plurality of LED light sources. That is, in this embodiment, each LED light source is taken as the minimum circuit, and light-emitting correction is performed pertinently for each LED, thereby improving the accuracy of light-emitting correction. During detection, each LED light source can emit light independently, so as to obtain the light-emitting information of the LED light source.

The color correction detection device 20 may include a color pickup circuit, a data conversion circuit, a filter circuit and the like. According to the target to be corrected, the color pickup circuit may include various types of optical sensors, such as luminance sensor, chromaticity sensor, color temperature sensor, etc. The color correction detection device 20 generally has an acquisition window exposed on the surface of the color correction detection device 20. The acquisition window is arranged facing the light-emitting surface of the external flash 10, so that the color pickup circuit can receive the light emitted by the external flash 10. In this embodiment, the light emitted by the external flash 10 can be picked up multiple times. Schematically, the external flash 10 is made to work in a variety of light-emitting modes, all for sampling light-emitting information. The light-emitting modes include flash mode, modeling lamp mode, constant bright mode and so on. In each mode, the light-emitting information is picked up at least once. The data conversion circuit is used for converting the analog quantity of the sampled light-emitting information into a corresponding digital quantity. The filter circuit is used for filtering the input or output of the data conversion circuit to reduce noise interference.

The color correction detection device 20 may also include a data arrangement circuit. The data arrangement circuit is connected to the analog-to-digital conversion circuit to perform data arrangement on the digital amount of the collected light-emitting information. The specific data arrangement mode may be determined according to the color correction algorithm, or may be arranged one-to-one according to the position arrangement of the LED in the external flash 10. In fact, the data arrangement circuit may also be provided in the electronic device 30.

Specifically, in one implementation, the electronic device 30 has a data arrangement circuit, which is electrically connected to the light-emitting information receiving circuit 31 to receive the Light-emitting Information received by the light-emitting information receiving circuit 31. The data arrangement circuit is used for arranging the light-emitting information.

In this embodiment, a plurality of sets of collected light-emitting information are converted and filtered by the color correction detection device 20, and then sent to the electronic device 30. The digital quantity data of the light-emitting information is sorted by the electronic device 30.

In this embodiment, the collected light-emitting information is sorted by the electronic device 30. Since data sorting requires a fast running speed and a large storage capacity, the data arrangement speed can be improved by utilizing the powerful processor and large storage capacity of the electronic device 30. More importantly, since there is no need to provide an arrangement circuit in the color correction detection device 20, the size of the color correction detection device 20 can be reduced, which is beneficial to improving the portability of the color correction detection device 20.

Further, the electronic device 30 may be provided with a data conversion circuit connected between the data arrangement circuit and the color correction detection device 20 to convert the light-emitting information transmitted by the color correction detection device 20 and then transmit the light-emitting information to the data arrangement circuit.

In this embodiment, the electronic device 30 completes the data conversion, and the color correction detection device 20 directly transmits the analog quantity of the sampled light-emitting information to the electronic device 30, which is beneficial to further reducing the size of the color correction detection device 20 and improving the portability.

The color correction processing circuit 32 also includes a data processing circuit in which a color correction processing algorithm is stored, and a logical calculation is performed on the sorted light emission data by means of the color correction processing algorithm, thereby generating the color correction result information. The color correction result information can be an adjustment program or a specific light-emitting correction value.

Schematically, in an example, the data processing circuit includes a color correction chip having a correction coefficient matrix in the color correction chip, and calculating and processing the sampled data after the sort based on the correction coefficient matrix.

It is also possible to correct the driving current of the external flash 10 by comparing the preset parameter value with the sampled light-emitting information arrangement data, so that the corrected driving current drives the external flash 10 so that the actual light-emitting parameters of the flash match the set parameters.

Figure 4:
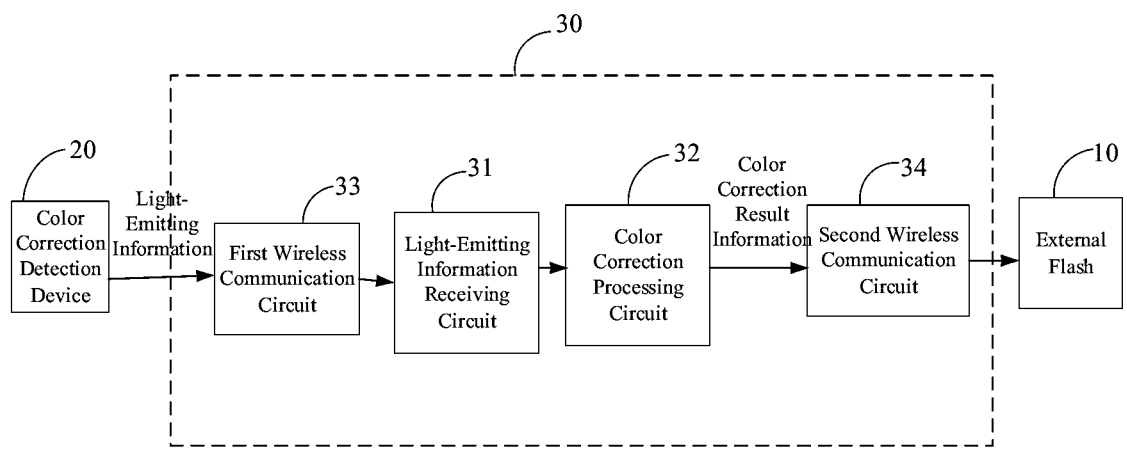
FIG. 4 is a circuit configuration block diagram of a color correction system of an external flash according to an exemplary embodiment.

FIG. 4 is a circuit configuration block diagram of a color correction system of an external flash according to an exemplary embodiment. In an embodiment, the electronic device 30 also has a first wireless communication circuit 33 for wireless communication with the color correction detection device 20, and the first wireless communication circuit 33 is electrically connected to the light-emitting information receiving circuit 31 to receive the light-emitting information and transmit the light-emitting information to the light-emitting information receiving circuit 31.

In this embodiment, the first wireless communication circuit 33 may be built into the color correction detection device 20 or may be externally arranged to the color correction detection device 20, such as an external USB wireless transceiver. The first wireless communication circuit 33 includes one or more of a WIFI module, a Bluetooth module, or a Zig-Bee module and an infrared communication module. This embodiment improves the convenience of communication between the color correction detection device 20 and the electronic device 30.

In another embodiment, the electronic device 30 has a first communication interface which is electrically connected to the light-emitting information receiving circuit 31 and is configured to be electrically connected to the color correction detection device 20 through a connecting line to transmit the light-emitting information to the light-emitting information receiving circuit 31. The first communication interface is one of a USB interface, a TYPE C interface, an RS232 interface and an RS485 interface.

In this embodiment, there may be one or more first communication interfaces.

In an embodiment, the electronic device 30 also has a second wireless communication circuit 34. The second wireless communication circuit 34 is electrically connected to the color correction processing circuit 32 so as to receive the color correction result information. The second wireless communication circuit 34 is used for wireless communication with the external flash 10 or with the color correction detection device 20 to transmit color correction result information to the external flash 10 or the color correction detection device 20 accordingly.

In this embodiment, there are two implementations, the first one is that the second wireless communication circuit 34 is in wireless communication with the external flash 10 to directly transmit the color correction result information to the external flash 10, specifically to a driving circuit or a control chip of the external flash 10. The second wireless communication circuit 34 may include one or more of a WIFI module, a Bluetooth module, or a Zig-Bee module, an infrared communication module.

The second one is that the wireless communication circuit communicates with the color correction detection device 20, and the color correction detection device 20 receives the color correction result information and then transmits the light-emitting information to the external flash 10. This method eliminates the need for communication connection between the color correction detection device 20 and the electronic device 30 and reduces the complexity of communication. In this manner, the second wireless communication circuit 34 may be the same as the first wireless communication circuit 33.

In another embodiment, the electronic device 30 also has a second communication interface electrically connected to the color correction processing circuit 32. The second communication interface is configured to be connected to the external flash 10 so as to transmit the color correction result information to the external flash 10; or the second communication interface is connected to the color correction detection device 20 so as to transmit the color correction result information to the color correction detection device 20. This embodiment can improve the reliability of data transmission.

In an embodiment, the electronic device 30 also has a third communication interface, which is electrically connected to the color correction processing circuit 32. The third communication interface is connected to a burning device, and the burning device is used for burning the color correction result information output by the third communication interface onto the control chip of the external flash 10, so as to correct the light-emitting control program in the control chip.

The burning device can carry out handshake communication with the external flash 10 and meet the related communication protocol, so as to smoothly carry out program burning, adjust the light-emitting control program of the original control chip and adjust the driving current of the light source circuit of the external flash 10, thereby fundamentally correcting the problem of luminous effect deviation of the external flash 10.

Figure 5:
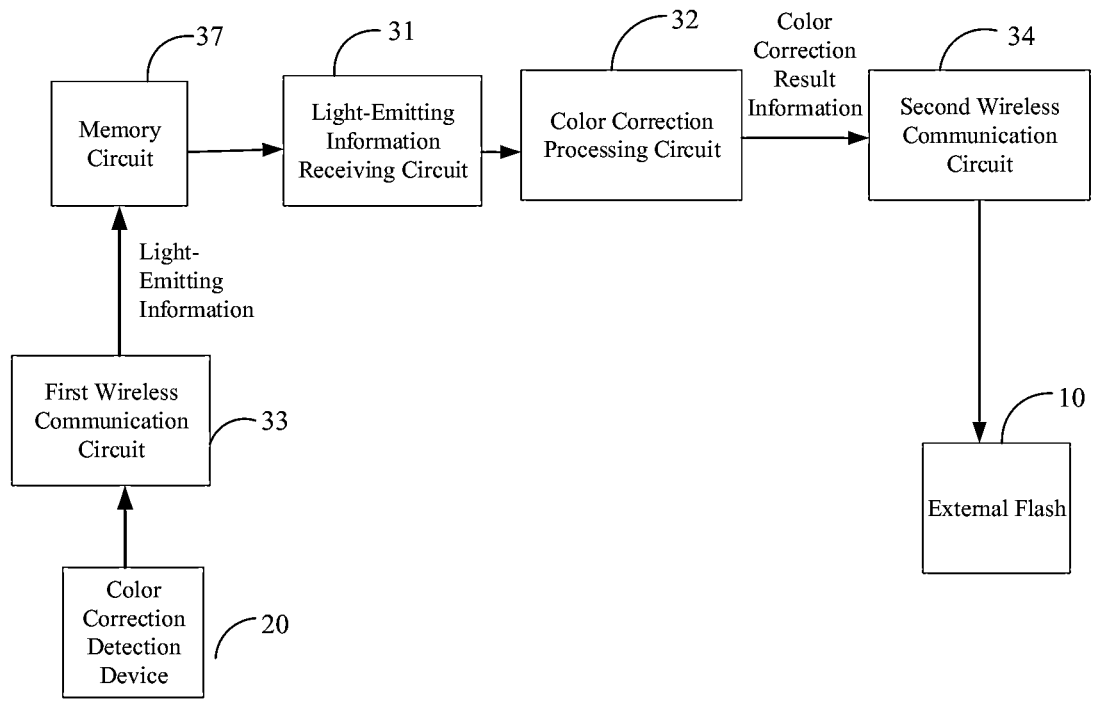
FIG. 5 is a circuit configuration block diagram of the color correction system of the external flash according to another exemplary embodiment.

FIG. 5 is a circuit configuration block diagram of the color correction system of the external flash according to another exemplary embodiment. In an embodiment, the electronic device further includes a memory circuit 37. The memory circuit 37 is configured for storing the plurality of sets of light-emitting information received. In an embodiment, the memory circuit 37 is connected at a position between the first wireless communication circuit 33 and the light-emitting information receiving circuit 31. In another embodiment, the memory circuit 37 is connected at a position between the light-emitting information receiving circuit 31 and the color correction processing circuit 32. The memory circuit 37 may be ROM, EPROM, or the like.

Schematically, when the color correction process is not required, the memory circuit 37 may save a plurality of sets of light-emitting information collected by the color correction detection device 20 in advance until the user starts the color correction process at an appropriate time, at which time the color correction processing circuit 32 reads the light-emitting information from the memory circuit 37.

Figure 6:
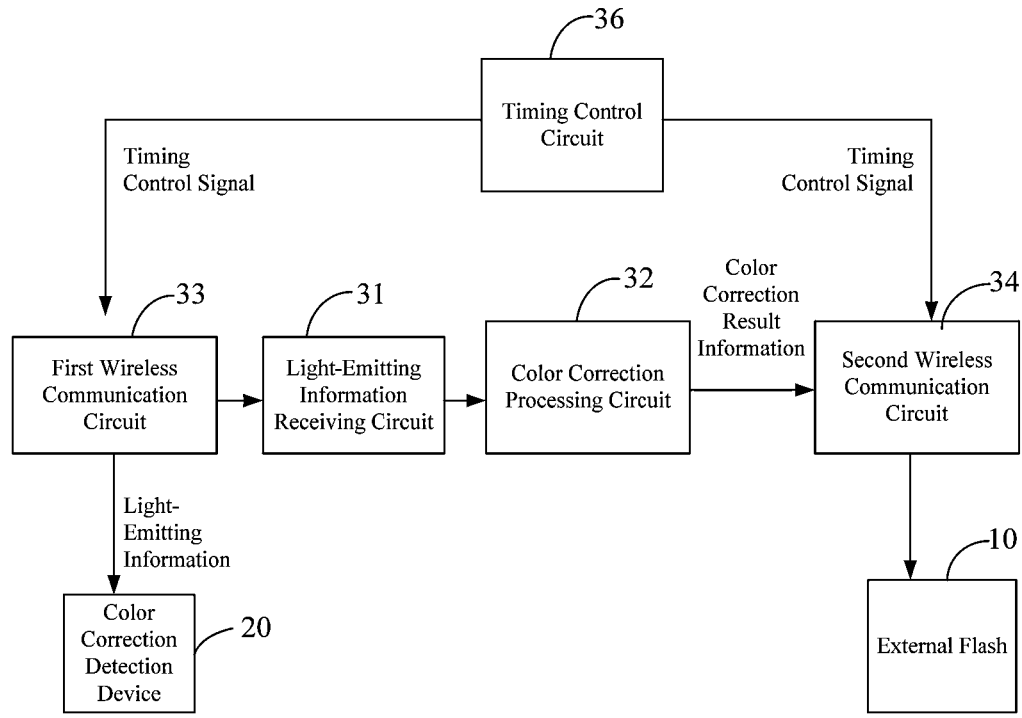
FIG. 6 is a circuit configuration block diagram of the color correction system of the external flash according to yet another exemplary embodiment.

FIG. 6 is a circuit configuration block diagram of the color correction system of the external flash according to yet another exemplary embodiment. In an embodiment, the electronic device 30 further includes a timing control circuit 36. The timing control circuit 36 is electrically connected to the external flash 10 to drive the external flash 10 to emit light at a preset timing. The timing control circuit 36 is also electrically connected to the color correction detection device 20, so that the timing control circuit 36 controls the color correction detection device 20 to detect light-emitting information of the external flash 10 at a preset timing when the light-emitting circuit emits light at the preset timing. In this case, the timing control circuit 36 may be generated in accordance with a color correction control instruction received on the electronic device 30.

In this embodiment, the timing control circuit 36 can issue a corresponding timing control signal according to the color correction control instruction. The timing control circuit 36 may issue timing instructions including a light-emitting mode execution sequence, a light-emitting frequency, a brightness change timing, a color change and the like of the external flash 10. The timing control circuit 36 is arranged so that the acquisition timing and the light emission timing are synchronized, the timing information corresponding to the acquired light emission information can be determined, and the correction accuracy can be improved. In addition, the embodiment allows the correction and detection device not to collect data when the external flash 10 does not emit light, thereby facilitating the reduction of noise interference to the correction and detection device and improving the accuracy of data arrangement, which is beneficial to saving energy.

In an embodiment, the electronic device 30 also includes a human-computer interaction component. The human-computer interaction component is arranged on the main body. The human-computer interaction component is electrically connected to the color correction detection device 20 and the color correction processing circuit 32. The human-computer interaction component is configured to receive a color correction instruction, receive a color correction setting parameter and switch one or more color correction modes.

In an example, the human-computer interaction component may be a touch screen component, a key component, a voice input component, etc. for a user to input instructions related to color correction. When the user transmits the color correction instruction, the color correction detection device 20 starts collecting the light-emitting information, and the color correction processing circuit 32 further starts data processing. The received color correction setting parameters include color correction accuracy parameters, color correction target parameters and the like. The color correction mode may include a luminance correction mode, a chrominance correction mode, a saturation correction mode, and a comprehensive correction mode (simultaneously correcting luminance, chrominance, saturation, etc.). In a specific embodiment, the human-computer interaction component includes a plurality of keys 304. The user presses the key 304 to issue a color correction instruction, set color correction parameters and switch color correction modes and the like.

In an embodiment, the electronic device 30 further includes a display screen 303. The display screen 303 is disposed on the casing 301. The display screen 303 is electrically connected to the color correction processing circuit 32 to display a color correction control interface under the control of the color correction processing circuit 32. In this embodiment, the color correction application software may be stored in the electronic device 30 (specifically, in the color correction processing circuit 32) in advance, and when the color correction application software is run, the color correction control interface may be displayed on the display screen 303. The color correction control interface is provided with a plurality of controls for users to issue color correction control instructions, set color correction parameters, select color correction modes, etc. The color correction control interface can also have a display window to display the color correction process. This embodiment improves the intelligence of the electronic device 30, improves the human-computer interaction capability, and is convenient for the user to correct different parameters of the external flash 10 according to his own requirements and correct them to target parameters that meet his own requirements.

The above-mentioned "circuits" may be implemented in whole or in part by software, hardware, firmware, or any combination thereof. Such as the light-emitting information receiving circuit 31, the color correction processing circuit 32, the first wireless communication circuit 33, the second wireless communication circuit 34, and the timing control circuit 36, may be constructed in the form of a circuit or in the form of a special chip.

Moreover, the light-emitting information and the color correction result information only indicate the substantial meaning of the signal. In fact, in the process of signal transmission, the form will change. For example, conversion of analog and digital quantities, transmission as a single signal or transmission in the form of packets, etc. are not specifically limited herein.

Referring to FIG. 4, the solution of the present application also provides a color correction system for an external flash. The color correction system includes the external flash 10, the color correction detection device 20 and the electronic device 30.

The color correction detection device 20 detects light-emitting information of the external flash 10. The electronic device 30 is electrically connected to the color correction detection device 20 to receive light-emitting information of the external flash 10 detected by the color correction detection device 20, and performs color correction processing based on the light-emitting information to generate color correction result information. The external flash 10 corrects light emission according to the color correction result information.

As in the above-described embodiments, the color correction result information may be directly transmitted to the external flash 10 by the electronic device 30 or may be transmitted to the color correction detection device 20 by the electronic device 30 and then transmitted to the external flash 10 by the color correction detection device 20.

While the present application has been described with reference to several exemplary embodiments, it should be understood that the terms used herein are illustrative and exemplary and are not limiting. Since the present application can be embodied in various forms without departing from the spirit or essence of the invention, it should therefore be understood that the foregoing embodiments are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. An electronic device for calibrating light emission of an external flash, comprising:
a casing, with an accommodating cavity inside, to accommodate a light-emitting information receiving circuit and a color correction processing circuit, wherein a side surface of the casing is provided with a toggle key, and when the toggle key is in an open state, the electronic device is activated, and when the toggle key is in a closed state, the electronic device is turned off;
wherein the light-emitting information receiving circuit is configured to be electrically connected to a color correction detection device, to receive light-emitting information of the external flash detected by the color correction detection device;
wherein the color correction processing circuit is electrically connected to the light-emitting information receiving circuit to receive the light-emitting information and configured to perform color correction processing according to the light-emitting information so as to generate color correction result information, and the color correction result information is configured to be transmitted to the external flash to correct light emission of the external flash;
wherein the electronic device further comprises a display screen, and the display circuit is used to display a color correction control interface;
wherein a color correction application software is installed in the electronic device, and when the color correction application software is run, the color correction control interface is displayed on the display screen;
wherein display content of the color correction control interface comprises one or more of color correction start/stop information, color correction parameter setting information and color correction mode switching information; and
wherein the electronic device further comprises a memory circuit for storing a plurality of sets of the light-emitting information received, and the memory circuit is connected at a position between the light-emitting information receiving circuit and the color correction processing circuit.

2. The electronic device according to claim 1, wherein the electronic device further comprises a first wireless communication circuit for wireless communication with the color correction detection device to receive the light-emitting information, wherein the first wireless communication circuit is electrically connected to the light-emitting information receiving circuit to transmit the light-emitting information to the light-emitting information receiving circuit.

3. The electronic device according to claim 1, wherein the electronic device further comprises a first communication interface, wherein the first communication interface is electrically connected to the light-emitting information receiving circuit and configured to be electrically connected to the color correction detection device through a connecting line so as to transmit the light-emitting information to the light-emitting information receiving circuit.

4. The electronic device according to claim 1, wherein the electronic device further comprises a second wireless communication circuit, wherein the second wireless communication circuit is electrically connected to the color correction processing circuit to receive the color correction result information;
wherein one of the following:
the second wireless communication circuit is configured for wireless communication with the external flash to transmit the color correction result information to the external flash; and
the second wireless communication circuit is configured to communicate with the color correction detection device to transmit the color correction result information to the color correction detection device.

5. The electronic device according to claim 1, wherein the electronic device further comprises a second communication interface electrically connected to the color correction processing circuit;
wherein one of the following:
the second communication interface is configured to be connected to the external flash to transmit the color correction result information to the external flash; and
the second communication interface is configured to be connected to the color correction detection device to transmit the color correction result information to the color correction detection device.

6. The electronic device according to claim 1, wherein the electronic device further comprises a third communication interface electrically connected to the color correction processing circuit; and wherein the third communication interface is configured to be connected to a burning device, and the burning device is configured to burn the color correction result information output by the third communication interface onto a control chip of the external flash to correct a light-emitting control program in the control chip.

7. The electronic device according to claim 1, wherein the electronic device further comprises a timing control circuit electrically connected to the external flash to drive the external flash to emit light at a preset timing; and
wherein the timing control circuit is further electrically connected to the color correction detection device to control the color correction detection device to detect the light-emitting information of the external flash at the preset timing when the external flash emits light at the preset timing.

8. The electronic device according to claim 1, wherein the electronic device comprises a data arrangement circuit electrically connected to the light-emitting information receiving circuit to receive the light-emitting information received by the light-emitting information receiving circuit and sort the light-emitting information.

9. The electronic device according to claim 8, wherein the electronic device further comprises a data conversion circuit connected at a position between the data arrangement circuit and the color correction detection device, so as to perform data conversion on the light-emitting information sent by the color correction detection device and then transmit the light-emitting information to the data arrangement circuit.

10. The electronic device according to claim 1, wherein the electronic device comprises a human-computer interaction component; and
wherein the human-computer interaction component is electrically connected to the color correction detection device and the color correction processing circuit, and the human-computer interaction component is configured to receive a color correction instruction, receive a color correction setting parameter and switch one or more color correction modes.

11. The electronic device according to claim 10, wherein the human-computer interaction component comprises one or more of a key receiving component, a voice input component, a touch input component, and a gesture control component.

12. The electronic device according to claim 1, wherein the electronic device is a handheld device.

13. The electronic device according to claim 1, wherein the electronic device is an intelligent terminal, wherein the electronic device further comprises a main function control circuit configured to provide main function for the intelligent terminal.

14. The electronic device according to claim 1, wherein the electronic device is one of a mobile phone, a tablet, a notebook computer or a smart wearable device.

15. A color correction system comprising:
an external flash, a color correction detection device, and an electronic device for calibrating light emission of the external flash;
wherein the electronic device comprises a casing, with an accommodating cavity inside, to accommodate a light-emitting information receiving circuit and a color correction processing circuit, a side surface of the casing is provided with a toggle key, and when the toggle key is in an open state, the electronic device is activated, and when the toggle key is in a closed state, the electronic device is turned off;
wherein the light-emitting information receiving circuit is configured to be electrically connected to a color correction detection device, to receive light-emitting information of an external flash detected by a color correction detection device;
wherein the color correction processing circuit is electrically connected to the light-emitting information receiving circuit to receive the light-emitting information and configured to perform color correction processing according to the light-emitting information so as to generate color correction result information, and the color correction result information is configured to be transmitted to the external flash to correct light emission of the external flash;
wherein the color correction detection device is configured to detect light-emitting information of the external flash, wherein the electronic device is electrically connected to the color correction detection device so as to receive the light-emitting information of the external flash detected by the color correction detection device, and performs color correction processing according to the light-emitting information to generate the color correction result information, and wherein the external flash corrects light emission according to the color correction result information;
wherein the electronic device further comprises a display screen, and the display circuit is used to display a color correction control interface;
wherein a color correction application software is installed in the electronic device, and when the color correction application software is run, the color correction control interface is displayed on the display screen;
wherein display content of the color correction control interface comprises one or more of color correction start/stop information, color correction parameter setting information and color correction mode switching information; and
wherein the electronic device further comprises a memory circuit for storing a plurality of sets of the light-emitting information received, and the memory circuit is connected at a position between the light-emitting information receiving circuit and the color correction processing circuit.

16. The color correction system according to claim 15, wherein the electronic device further comprises a first wireless communication circuit for wireless communication with the color correction detection device to receive the light-emitting information, wherein the first wireless communication circuit is electrically connected to the light-emitting information receiving circuit to transmit the light-emitting information to the light-emitting information receiving circuit.

17. The color correction system according to claim 15, wherein the electronic device further comprises a first communication interface, wherein the first communication interface is electrically connected to the light-emitting information receiving circuit and configured to be electrically connected to the color correction detection device through a connecting line so as to transmit the light-emitting information to the light-emitting information receiving circuit.

18. The color correction system according to claim 15, wherein the electronic device further comprises a second wireless communication circuit, wherein the second wireless communication circuit is electrically connected to the color correction processing circuit to receive the color correction result information;

wherein one of the following:
  the second wireless communication circuit is configured for wireless communication with the external flash to transmit the color correction result information to the external flash; and
  the second wireless communication circuit is configured to communicate with the color correction detection device to transmit the color correction result information to the color correction detection device.

* * * * *